United States Patent [19]
Hering

[11] Patent Number: 5,538,121
[45] Date of Patent: Jul. 23, 1996

[54] PRESSURE ACTUATED MULTI-DISK CLUTCH

[75] Inventor: Hubert Hering, Kirchheim, Germany

[73] Assignee: Deere & Company, Moline, Ill.

[21] Appl. No.: 433,366

[22] PCT Filed: Oct. 23, 1993

[86] PCT No.: PCT/EP93/02936

§ 371 Date: May 2, 1995

§ 102(e) Date: May 2, 1995

[87] PCT Pub. No.: WO94/10471

PCT Pub. Date: May 11, 1994

[30] Foreign Application Priority Data

Nov. 3, 1992 [DE] Germany .................. 42 37 075.2

[51] Int. Cl.[6] ............................................... F16D 25/0638
[52] U.S. Cl. ........................... 192/70.12; 192/70.13; 192/70.14; 192/91 A; 192/110 S; 192/113.35; 192/113.36
[58] Field of Search ............... 192/91 A, 70.12, 192/70.13, 70.14, 70.27, 85 AA, 110 S, 113.34, 113.35, 113.36, DIG. 1, 56.31, 58.42

[56] References Cited

U.S. PATENT DOCUMENTS 3,047,115  7/1962  Lee et al. .
3,213,984  10/1965 Cook .
3,893,556  7/1975  Lech et al. .

FOREIGN PATENT DOCUMENTS 332850   9/1989  European Pat. Off. .
519387   12/1992 European Pat. Off. .
2138940  1/1973  France .
2633024  12/1989 France .
4119874  1/1993  Germany .
534318   4/1973  Switzerland .
1025591  4/1966  United Kingdom .

*Primary Examiner*—Richard M. Lorence

[57] ABSTRACT

A pressurized fluid actuated multi-disk clutch for vehicles, in particular a clutch provided for the shifting of an additional axle in the drive line of an agricultural or industrial vehicle is described. The multi-disk clutch contains a clutch bell housing (34) within which outer clutch disks (30) are arranged, fixed against rotation, and which is supported in bearing, free to rotate, on a shaft (12) with a set of gear teeth that mesh with inner clutch disks (26). Furthermore a piston (46) is provided that can be moved axially against the force of a spring arrangement (54, 55) by means of a pressurized fluid and that acts upon the clutch disk package (28) consisting of the inner clutch disks (26) and the outer clutch disks (30). In order to obtain a multi-disk clutch that is compact and saves space, that consists of as few individual components as possible and that can be assembled simply and rapidly, it is proposed that the clutch disk package (28), the piston (46) and the spring arrangement (54,55) be arranged within the clutch bell housing (34) and form with the latter a subassembly that can be pre-assembled and slid upon the shaft (12). The clutch bell housing (34) with the piston (46) and the shaft (12) enclose a generally sealed chamber (52) that contains the clutch disk package (28), and that can be connected to a source of pressurized fluid (66). Furthermore the shaft (12) is configured progressively stepped at least to one side in the region of the clutch bell housing (34).

17 Claims, 1 Drawing Sheet

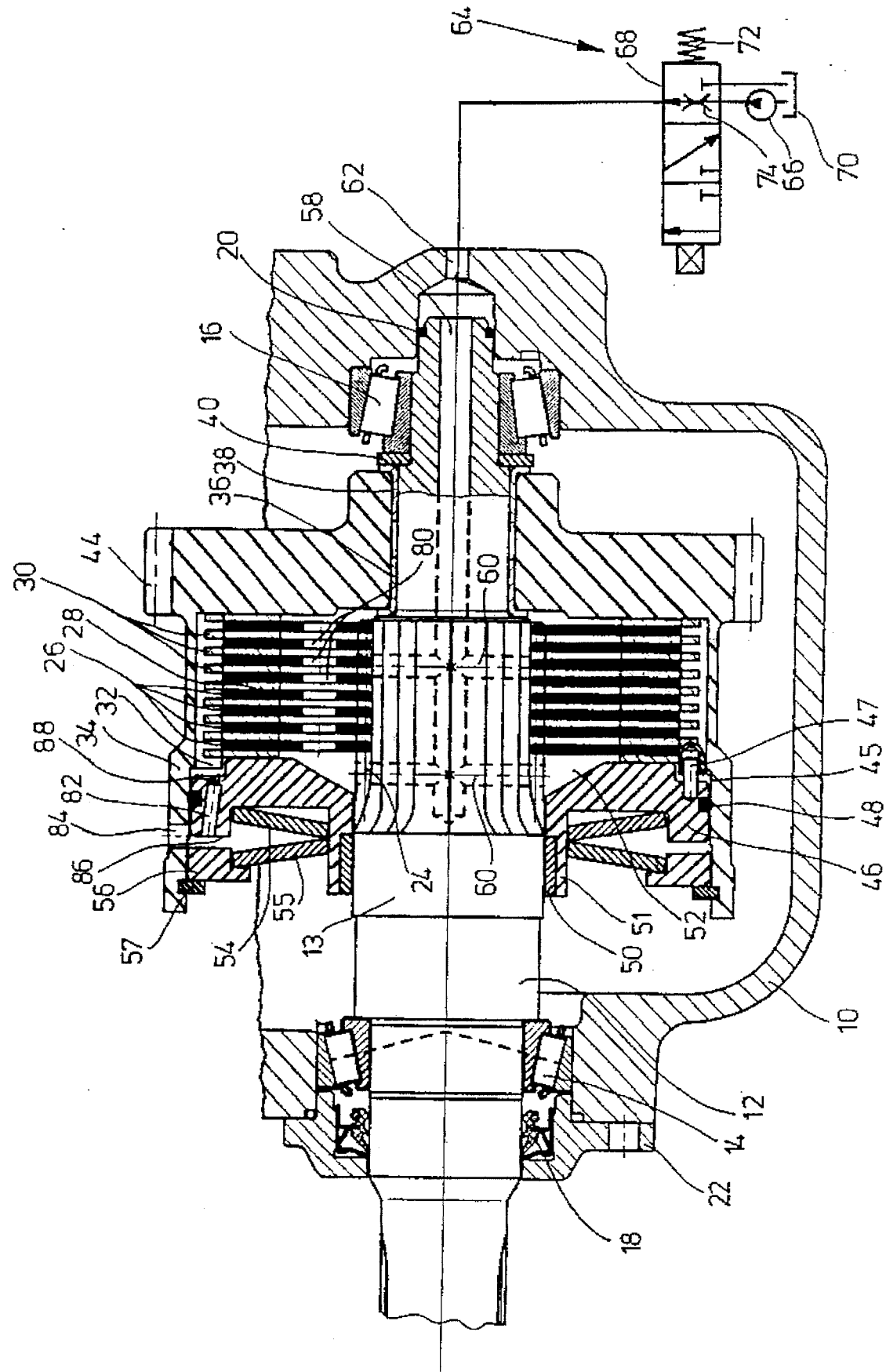

PRESSURE ACTUATED MULTI-DISK CLUTCH

The invention concerns a pressure actuated multi-disk clutch, operating in friction, for vehicles having an additional or auxiliary drive axle.

In agricultural and industrial vehicles, such as agricultural tractors and the like, pressure actuated multi-disk clutches are applied for the engagement of front wheel drives. These clutches are usually controlled by pressurized oil. For reasons of safety the stack of clutch disks is loaded by a spring arrangement, so that the clutch is applied (engaged) in the absence of any pressure. If, however, pressurized oil is applied to a piston chamber of the clutch, then the piston compresses the spring arrangement, whereby the load forcing the surfaces of the clutch disks against each other and thereby also the engagement of the clutch is canceled.

In addition to the clutch disks, clutches of this type usually contain pressure plates which cover the stack of disks on both sides, means of transmitting the force of the piston to the spring arrangement and other auxiliary devices. One pressure plate supports the stack of clutch disks against the clutch drum, while the other pressure plate engages the spring arrangement.

The problem underlying the invention is seen as that of defining a multi-disk clutch of the aforementioned type that is compact and space saving, consists of as few individual components as possible and that can be assembled easily and quickly.

The problem is solved on the basis of the overall concept of patent claim 1 through its particular characteristics. Further advantageous embodiments and further developments of the invention follow from the subordinate claims.

Preferably this is a multi-disk clutch that is engaged by spring force and disengaged by the pressure of a pressurized fluid, where the chamber containing the clutch disks is configured as a generally sealed chamber, into which the pressurized fluid for the disengagement of the clutch is introduced. Between the shaft and the clutch bell housing a piston is arranged that can be moved axially and that is forced against the clutch disks by a spring arrangement in order to assure the transmission of a torque. In the region of the clutch unit, which can be pre-assembled as a unit, the shaft is progressively stepped towards one side and is therefore appropriate as a plug-in assembly.

The input drive gear preferably is molded as a unit with the clutch bell housing which can consist of a casting or a forging. This one-piece design permits the transmission of the forces applied to the input drive gear directly through the clutch assembly, the piston and the clutch disks to the shaft.

The clutch unit is supported on two bearings, where one bearing is located at the clutch bell housing approximately under the input gear and the other bearing at the piston.

A preferred embodiment of the invention provides that the clutch disks are arranged directly between a radial surface of the housing enclosing the chamber and a radial surface of a spring-loaded piston that can be moved axially with respect to the housing where at least one compression spring, preferably a Belleville spring supported on the housing, engages the side of the piston outside the chamber. This solution makes pressure plates and other auxiliary devices superfluous. Thereby the number of components can be reduced, resulting in a low-cost design.

The multi-disk clutch according to the invention consists of a minimal number of components and therefore can be manufactured at very low cost. All components relevant to the clutch are inserted into the clutch bell housing and pre-loaded by a Belleville spring package. The shaft, which is preferably the output shaft and which may be designed as a one-piece shaft, is plugged into the pre-assembled clutch unit and is preferably fixed in its axial location by two bearings. This assures an assembly process optimized for time. Furthermore extensive pre-assembly is possible.

In contrast to known clutches the multi-disk clutch according to the invention can be integrated into a very compact design and saves space. When it is engaged, cooling can be accomplished without any additional components.

The piston is preferably connected with the clutch bell housing fixed against rotation. For this purpose at least one axial alignment pin may be provided one end of which engages a bore in an end face of the clutch bell housing and whose other end engages an opposite end face bore in the piston.

Furthermore it is advantageous to conduct the pressurized fluid through an axial bore and at least one supply bore connecting the chamber with the axial bore, where the pressure can be controlled by a control valve located outside the multi-disk clutch.

Most appropriately several supply bores are provided that are distributed over the axial extent of the stack of clutch disks, so that the pressurized fluid can first spread across the chamber and simultaneously penetrate between the clutch disks, so that the disks separate more easily from one another.

For this purpose the clutch disks may also be provided with axial bores. Preferably such bores are located in the inner disks which are connected to the shaft, specifically in that region that is radially outward of the set of gear teeth between the clutch disk lining and the shaft.

In order to ease the entry of the pressurized fluid between the disks it is also advantageous to provide grooves in the surface of the clutch disks that are generally radial and relatively narrow so as to reduce the lining area as little as possible. Hereby the pressurized fluid (fluid, for example, pressurized oil) can spread across the friction surfaces and contact surfaces of the clutch disks, so that, once a predetermined pressure in the clutch disk chamber is reached and the piston is moved against the force of the spring arrangement, the clutch disks separate from one another and the transmission of torque is interrupted.

The clutch disks are preferably a package of disks that is arranged between a radial surface of the housing enclosing the chamber and a radial surface of the piston. The piston thus simultaneously becomes a pressure plate of the clutch. Separate clutch pressure plates are not required.

In order to avoid axial forces between the clutch housing and the clutch shaft as a result of pressure forces in the chamber, the surfaces of the piston and the housing that are affected by the pressurized fluid are preferably configured equally large.

A high load on the clutch of a vehicle drive can lead to the clutch disks sliding against each other even though the clutch is engaged. This condition contains the danger that the clutch disks are heated by friction after a short time to such a degree that they are damaged.

In order to provide optimum cooling of the clutch disks when the clutch is engaged, a preferred embodiment of the invention suggests connecting a radially outward region of the chamber through a valve arrangement with a pressurized fluid reservoir. Most appropriately the connecting opening is located in the upper region of the chamber, in order to assure that the cooling fluid flows through the surfaces of the lining.

The valve arrangement is preferably designed and arranged in such a way that it is controlled by the pressure of the pressurized fluid in the chamber.

In order to avoid an unnecessary cooling flow through the clutch when the clutch is disengaged, it is appropriate that the valve arrangement close a connection between the chamber and the pressurized fluid reservoir when the clutch disks are separated from one another as a result of the pressure in the chamber.

The cross section of the connection between the chamber and the reservoir is selected in such a way that an adequate cooling flow is assured even at a relatively small pressure difference between the sealed chamber and pressurized fluid reservoir. The cooling flow can be provided by a small pressure increase in the chamber or by centrifugal forces.

The connecting channel between the radially outward region of the chamber and the pressurized fluid reservoir preferably contains at least one orifice that maintains the volume flow largely constant when the valve arrangement is open independent of any changes in the temperature-dependent viscosity of the pressurized fluid.

A simple, low-cost, easily manufactured valve arrangement is obtained by providing at least one channel in the piston in its upper region leading from the chamber to the outside which can be automatically closed when the piston is moved against the spring force.

There is an advantage in providing a generally radial opening in the clutch bell housing which forms a connection together with the channel of the piston between the chamber and the reservoir and which is closed automatically upon a movement of the piston against the spring force.

The chamber is necessarily largely sealed, therefore the cooling oil flow is limited. Hence the multi-disk clutch according to the invention is preferably used in applications in which relatively small amounts of torque are transmitted in friction, or where small differences in the relative rotational speeds exist between the shafts to be connected before the clutch is engaged. This is the case, for example, in central differential gears in motor vehicles as well as in front axle clutches and differential locking clutches.

The drawing shows an embodiment of the invention on the basis of which the invention as well as further advantages and advantageous further developments and embodiments of the invention shall be explained and described in greater detail in the following.

The single FIGURE shows a section through a multi-disk clutch according to the invention. In a clutch housing 10 a shaft 12 is supported in two tapered roller bearings 14, 16. The clutch housing 10 is also used as reservoir in which pressure or cooling oil is collected. The ends of the shaft are sealed by seals 18, 20 to the clutch housing 10 or to a bearing cover 22.

The shaft 12 has its largest cross section in its central region 13. As seen in the figure to the right alongside this central region 13 the shaft 12 is provided with a set of gear teeth 24 that meshes with the inner disks 26 of a package of disks 28. The outer disks 30 of the package of disks 28 mesh with a set of gear teeth 32 in a clutch bell housing 34.

The clutch bell housing 34 provides a housing for the package of disks 28 and is supported in journal bushings 36, 38 on the shaft 12, free to rotate, and is secured by a thrust washer 40 against axial forces. A drive gear 44 is molded onto the clutch bell housing 34 and meshes with an output gear of a vehicle gearbox, not shown. The shaft bearing of the clutch bell housing 34 is located at approximately the same axial position as the drive gear 44.

In a cylindrical recess 45 of the clutch bell housing 34 a piston 46 is arranged so that it can move axially but is fixed against rotation with respect to the clutch bell housing 34. Relative rotation is prevented by an axial alignment pin 47, one end of which is secured with a press fit in a bore in the end face of the piston 46 and whose other end engages an opposite bore in the end face of the clutch bell housing 34 with a sliding fit, so as to permit a relative axial movement of the piston 46 to the clutch bell housing 34.

The piston 46 is supported on the shaft 12 by a bronze bushing 50, free to rotate and to move axially. The bronze bushing 50, which also acts as a seal, is press fitted into a cylindrical recess in a cylindrical projection 51 extending outward and molded onto the piston 46. Any tilting of the piston 46 with respect to the shaft 12 is prevented by the relatively large axial length of the projection 51. In place of the bronze bushing 50 a needle bearing with an additional seal may be provided as bearing.

The piston 46 is sealed against the clutch bell housing 34 by an O-ring 48. The sealing between the shaft 12 and the piston 46 and the clutch bell housing 34 can be provided by seals, not shown. For example, this may use rings that are inserted into corresponding grooves in the shaft 12. Such rings are designed for rotational as well as axial movements.

On the side of the projection 51 the piston 46 is provided with a cylindrical recess into which a first Belleville spring 54 is inserted and whose outer edge is in contact with the piston 46. A second Belleville spring 55 is in contact on its inner diameter with the first Belleville spring 54 and is supported on its outer diameter by a spacer 56 which, for its part, is secured against axial movement by a retaining ring 57 seated in a groove in the clutch bell housing 34. The Belleville springs 54, 55 force the piston 46 against the package of disks 28 and compresses the latter. When the package of disks 28 is compressed the clutch is engaged and transmits a torque from the input drive gear 44 through the clutch bell housing 34 to the shaft 12. The pre-load of the Belleville springs 54, 55 is selected in such a way that a predetermined torque is transmitted without the disks 26, 30 sliding against each other.

In addition to engaging the second Belleville spring 55, the spacer 56 is also used as a stop that permits only a limited axial movement of the piston 46 as well as a valve as will be described below.

The package of disks 28, the piston 46 and the spring arrangement consisting of the Belleville springs 54, 55 and the spacer 56 are arranged completely in the clutch bell housing 34 and compose with the latter a subassembly that can be pre-assembled and slid onto the shaft 12. For the pre-assembly the journal bushing 36 is inserted into an axial bore in the clutch bell housing 34. Thereupon the outer disks 30 and the inner disks 26 are alternately stacked in the chamber 52 of the clutch bell housing 34. Then the piston 46 with the O-ring 48 mounted, the bronze bushing 50 and alignment pin 47 as well as the two Belleville springs 54, 55 and the spacer 56 are inserted into the cylindrical recess 45. Finally the complete package is compressed and the retaining ring 57 is inserted into a groove in the clutch bell housing 34, which prevents the spacer 56 from an outward axial movement.

The shaft 12 is stepped from its central region 13 to both sides with decreasing cross sections. Since the shaft 12 is progressively stepped in the region of the clutch bell housing 34 towards its (right) free end, for further assembly of the multi-disk clutch the pre-assembled unit of the clutch bell housing 34 can be slid onto the end of the shaft 12 shown at the right in the figure, so that it occupies the position shown in the figure and the bronze bushing 50 is arranged with a sliding fit on the central region 13 of the shaft 12.

After seating the thrust washer 40 of the tapered roller bearing 16 and the seal 20 on the end of the shaft at the right in the figure, the left end of the shaft is inserted into an opening provided therefore in the clutch housing 10. The shaft 12 is shifted to the right so that its right end is supported over the tapered roller bearing 16 at the clutch housing 10. Finally the tapered roller bearing 14, the seal 18 and the bearing cover 22 are mounted on the left end of the shaft.

The clutch bell housing 34, the shaft 12 and the piston 46 enclose a chamber 52 that is generally sealed and in which the package of disks 28 is located. With its one side the package of disks 28 is in contact with a ring-shaped projection of the clutch bell housing 34 and with its other side with a ring-shaped projection of the piston 46. Separate pressure plates are not provided.

The shaft 12 is provided with an axial bore 58 as well as radial supply bores 60. Only two of the supply bores 60 are shown, they connect the axial bore 58 with the chamber 52. The axial bore 58 is connected through a housing bore 62 with a hydraulic supply system 64. The latter system consists generally of a hydraulic pump 66, a valve 68 and a reservoir 70. The pump 66 delivers the system pressure of, for example, 12 bar. The valve 68 is configured as an electromagnetic three-way control valve with three positions, which can be moved against the force of a spring 72 by an electric control signal from its first position as shown. The degree of its movement depends upon the magnitude of the electrical control signal.

In its first position, as shown, the valve 68 connects the hydraulic pump 66 with the chamber 52. In this position, however, the valve 68 contains a throttling restriction 74, so that the system pressure of the pump 66 is reduced to, for example, 1 to 2 bar. This pressure is not sufficient to move the piston 46 outward against the force of the Belleville springs 54, 55, to separate the disks 26, 30 from one another and to disengage the clutch. It does, however, provide cooling of the package of disks 28, as will be described below.

In a second, central position of the valve 68 the chamber 52 is connected with the reservoir 70, so that the pressure in the chamber 52 is released and the clutch is also engaged in this position.

In a third position the valve 68 connects the outlet of the hydraulic pump 66 with the chamber 52 without any significant throttling. The pressure in the chamber 52 increases to the system pressure, as a result of which the piston 46 moves outward against the force of the Belleville springs 54, 55, so that the force of the Belleville springs 54, 55 compressing the package of disks 28 is opposed and the disks 26, 30 can rotate with respect to each other. Thereby in this third valve position the clutch is disengaged and does not transmit any torque.

In order to assure good pressure balance in the chamber 52 the inner disks 26 are provided with transverse bores 80 in their radially inward region. Furthermore the surfaces of the disks 26, 30 carrying the clutch lining are provided with approximately radial grooves, through which fluid can penetrate between the disks 26, 30, so that pressure between the disks 26, 30 is equalized. In addition the grooves permit a fluid penetration from radially inward to the outside, in order to maintain a cooling fluid flow even when the clutch is engaged.

The piston 46 is provided with a generally axial channel 82 in its upper region, located outside the radial extent of the inner disks 26. The enclosing region of the clutch bell housing 34 contains a radial penetration 84 in its upper region. The channel 82 and the penetration 84 provide a connection between the chamber 52 and the exterior of the clutch bell housing 34 that is used as a reservoir. A cooling fluid flow can be maintained through this connection.

When the piston 46 is shifted from the chamber 52 to the outside, to the left in the figure, the penetration 84 is closed by the outer contour of the piston 46. Furthermore, as soon as the piston 46 makes contact with its outer ring surface 86 against the spacer 56, the opening of the channel 82 is closed. Thereby the penetration 84 with the outer contour of the piston 46 on the one hand and the channel 82 with the spacer 56 on the other hand act as a valve arrangement which opens or closes the connection between the chamber 52 and the reservoir.

The axis of the channel 82, which is configured as a through bore, is inclined slightly with respect to the rotational axis of the clutch, so that its outer opening with respect to the chamber 52 is radially somewhat further outside than its inner opening. This inclined orientation promotes the outflow of the cooling fluid due to centrifugal forces when the clutch bell housing 34 is rotating, so that a flow of cooling fluid can be maintained even when no excess pressure is built up in the chamber 52 from the hydraulic supply system 64.

The channel 82 contains a throttling restriction 88 whose dimensions can be adjusted to provide a constant volume flow independent of the viscosity of the cooling fluid.

I claim:

1. Fluid pressure actuated multi-disk clutch for vehicles, operating in friction, in particular a clutch for the shifting of an additional axle into the drive line of an agricultural or industrial vehicle, with a clutch bell housing (34) within which outer clutch disks (30) are arranged, fixed against rotation, which is supported in bearing, free to rotate, on a shaft (12) that meshes with a set of gear teeth with inner clutch disks (26) and with a piston (46) that can be moved axially by a pressurized fluid against the force of a spring arrangement (54, 55) and that applies force to a clutch disk package (28) consisting of the inner clutch disks (26) and the outer clutch disks (30), characterized by the clutch disk package (28), the piston (46) and the spring arrangement (54, 55) being arranged within the clutch bell housing (34) and that these together compose a subassembly that can be pre-assembled, the shaft (12) is configured with progressive steps at least to one side in the region of the clutch bell housing (34) and said piston having an inner diameter which is at least as large as an inner diameter of said inner clutch disks to facilitate the subassembly being slid onto the shaft (12), and that the clutch bell housing (34) with the piston (46) and the shaft (12) compose a generally sealed chamber (52) that encloses the clutch disk package (28) and that can be connected to a source of fluid pressure (66).

2. Multi-disk clutch according to claim 1, characterized in that the clutch disk package (28) is compressed by the force of the spring arrangement (54, 55) which is supported on the clutch bell housing (34) and acts on the piston 46, and is released by the pressure of the pressurized fluid.

3. Multi-disk clutch according to claim 1, characterized in that the clutch disk package (28) is arranged directly between a radial surface of the clutch bell housing (34) which borders the chamber (52) and a radial surface of the piston (46) that can be shifted axially towards the clutch bell housing (34).

4. Multi-disk clutch according to claim 1 or 3, characterized in that the spring arrangement contains at least one Belleville spring (54, 55) which is supported on the one hand on the side of the piston (46) that is located outside the chamber (52) and on the other hand on a ring (56) which is supported on the clutch bell housing (34).

5. Multi-disk clutch according to claim 1 or 3, characterized in that a gear (44) is molded to the clutch bell housing (34) for use as a drive input or drive output gear.

6. Multi-disk clutch according to claim 5, characterized in that the clutch bell housing (34) and the piston (46) are each supported on the shaft (12) by at least one bearing arrangement (36, 38; 50).

7. Multi-disk clutch according to claim 6, characterized in that the shaft bearing arrangement (36, 38) of the clutch bell housing (34) is located at the same axial position as the gear (44).

8. Multi-disk clutch according to claim 7, characterized in that the piston (46) is connected to the clutch bell housing (34) and fixed against rotation with respect thereto.

9. Multi-disk clutch according to claim 8, characterized by at least one alignment pin (47) that is provided, that extends axially and that engages with one end a bore in the end face of the clutch bell housing (34) and with the other end an opposite bore in the end face of the piston (46).

10. Multi-disk clutch according to claim 1, characterized in that the shaft (12) is provided with at least one axial bore (58) and at least one supply bore (60) which connects the chamber (52) with the axial bore (58) for the supply of the pressurized fluid.

11. Multi-disk clutch according to claim 1 or 10, characterized in that the clutch disks (26, 30) are provided with axial penetrations (80) and/or generally radial grooves on the surface of their linings.

12. Multi-disk clutch according to claim 1, characterized in that a radially outward region of the chamber (52) is connectable to a fluid reservoir through a valve arrangement.

13. Multi-disk clutch according to claim 12, characterized in that the valve arrangement is controlled by the pressure of the pressurized fluid existing in the chamber (52).

14. Multi-disk clutch according to claim 13, characterized in that the valve arrangement closes a connection between the chamber (52) and the fluid reservoir as long as the clutch disks (26, 30) are separated from one another as a result of the pressure existing in the chamber (52).

15. Multi-disk clutch according to claim 14, characterized by a connecting channel (82) provided between the radially outward region of the chamber (52) and the fluid reservoir that contains at least one throttling restriction (88) which largely maintains constant the volume flow passing through it when the valve arrangement is open.

16. Multi-disk clutch according to claim 14, characterized in that the piston (46) contains at least one channel (82) leading from the chamber (52) to the outside which automatically closes upon a movement of the piston (46) against the force of the spring arrangement (54, 55).

17. Multi-disk clutch according to claim 16, characterized in that the clutch bell housing (34) is provided with a generally radial opening (84) that, together with a channel (82) in the piston (46), forms a connection between the chamber (52) and the fluid reservoir that automatically closes upon a movement of the piston (46) against the force of the spring arrangement (54, 55).

* * * * *